United States Patent
Yoshimura et al.

(10) Patent No.: US 9,124,659 B2
(45) Date of Patent: Sep. 1, 2015

(54) SHARED SPACE FOR CREW COMMUNICATION

(71) Applicant: The Boeing Company, Chicago, IL (US)

(72) Inventors: Scott T. Yoshimura, Renton, WA (US); Mark G. Mehlhaff, Seattle, WA (US); Michael Joseph Burgess, Seattle, WA (US); Richard Leroy Rankin, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 72 days.

(21) Appl. No.: 13/948,473

(22) Filed: Jul. 23, 2013

(65) Prior Publication Data
US 2015/0033296 A1 Jan. 29, 2015

(51) Int. Cl.
*G06F 15/16* (2006.01)
*H04L 29/06* (2006.01)
*H04W 12/08* (2009.01)
*H04L 29/08* (2006.01)

(52) U.S. Cl.
CPC ............ *H04L 65/403* (2013.01); *H04L 63/083* (2013.01); *H04L 63/107* (2013.01); *H04L 63/108* (2013.01); *H04L 67/12* (2013.01); *H04W 12/08* (2013.01)

(58) Field of Classification Search
USPC .......................................................... 726/5
See application file for complete search history.

(56) References Cited

U.S. PATENT DOCUMENTS

| | | | |
|---|---|---|---|
| 6,584,400 B2 * | 6/2003 | Beardsworth | 701/120 |
| 7,181,426 B2 * | 2/2007 | Dutta | 705/37 |
| 7,603,281 B1 * | 10/2009 | Miller et al. | 705/1.1 |
| 8,068,829 B2 | 11/2011 | Lemond et al. | |
| 2002/0156659 A1 * | 10/2002 | Walker et al. | 705/5 |
| 2004/0190718 A1 * | 9/2004 | Dacosta | 380/247 |
| 2008/0132212 A1 * | 6/2008 | Lemond et al. | 455/414.1 |
| 2011/0130948 A1 * | 6/2011 | Oh et al. | 701/120 |
| 2013/0091207 A1 * | 4/2013 | Diab | 709/204 |
| 2014/0304350 A1 * | 10/2014 | Rana et al. | 709/206 |

FOREIGN PATENT DOCUMENTS

EP 2582116 A2 4/2013

OTHER PUBLICATIONS

International Patent Application No. PCT/US2014/040837; International Search Report and the Written Opinion; dated Sep. 30, 2014; 8 pages.

* cited by examiner

*Primary Examiner* — Amare F Tabor
(74) *Attorney, Agent, or Firm* — Baker & Hostetler LLP

(57) ABSTRACT

A predetermined group of users using one or more computing devices are allowed to join a shared collaboration and communication space associated with the predetermined group of users. The shared collaboration and communication space is associated with the predetermined group of users for a specified time period and for a predetermined operation that the predetermined group of users are authorized to work on. The predetermined group of users are authenticated based on user identities and information identifying the predetermined operation. The shared collaboration and communication space allows for interactive communication among the predetermined group of users.

18 Claims, 10 Drawing Sheets

SHARED SPACE FOR CREW COMMUNICATION

BACKGROUND

Transportation crew and staff typically use communications tools to perform operations. For example, airlines personnel typically use various methods of communication during flight turn operations. Such communications may include the use of hardwired phones in the passenger boarding bridge that are connected to the gate, traditional phone lines from the gate to the operations office, very high frequency (VHF) radios from the flight deck to the operations office, handheld radios used from the below wing personnel to the operations office, hardwired channels from the below wing mechanic to the flight deck, and airline personnel's personal mobile phones. Other transportation operations, such as passenger train and cruise ship operations, also use a number of methods of communications.

SUMMARY

Illustrative examples of the present disclosure include, without limitation, a method, device, and computer-readable storage medium. In one aspect, a method for communication by a predetermined group of users using one or more computing devices is described. A request to join a shared collaboration and communication space associated with the predetermined group of users is received. The shared collaboration and communication space may be associated with the predetermined group of users for a limited time period and for a predetermined operation. The request is authenticated based at least in part on a user identity and information pertaining to the predetermined operation. In response to the authenticating, a user interface indicative of the shared collaboration and communication space is provided.

In another aspect, a device configured to communicate in a collaboration and communication space is provided. The device may include a processor and memory. A request to join the shared collaboration and communication space may be communicated. The shared collaboration and communication space may be associated with a predetermined group of users for a predetermined time period and for a predetermined operation. A user identity and information identifying the predetermined operation may be communicated. In response to receiving an indication that the request is approved, an application for allowing a user to join the shared collaboration and communication space is executed.

In another aspect, a non-transitory computer-readable storage medium is provided. Information indicative of a predetermined group of users and a predetermined operation associated with the predetermined group of users is received. Requesting users of the predetermined group of users are allowed to join a shared collaboration and communication space associated with the predetermined operation based on identification of the requesting users and verification that the users are associated with the predetermined operation. Users who have joined the shared collaboration and communication space are allowed to communicate via the shared collaboration and communication space.

Other features of the disclosure are described below. The features, functions, and advantages can be achieved independently in various examples or may be combined in yet other examples, further details of which can be seen with reference to the following description and drawings.

BRIEF DESCRIPTION OF DRAWINGS

Examples of techniques in accordance with the present disclosure are described in detail below with reference to the following illustrations.

DETAILED DESCRIPTION

Figure 1:
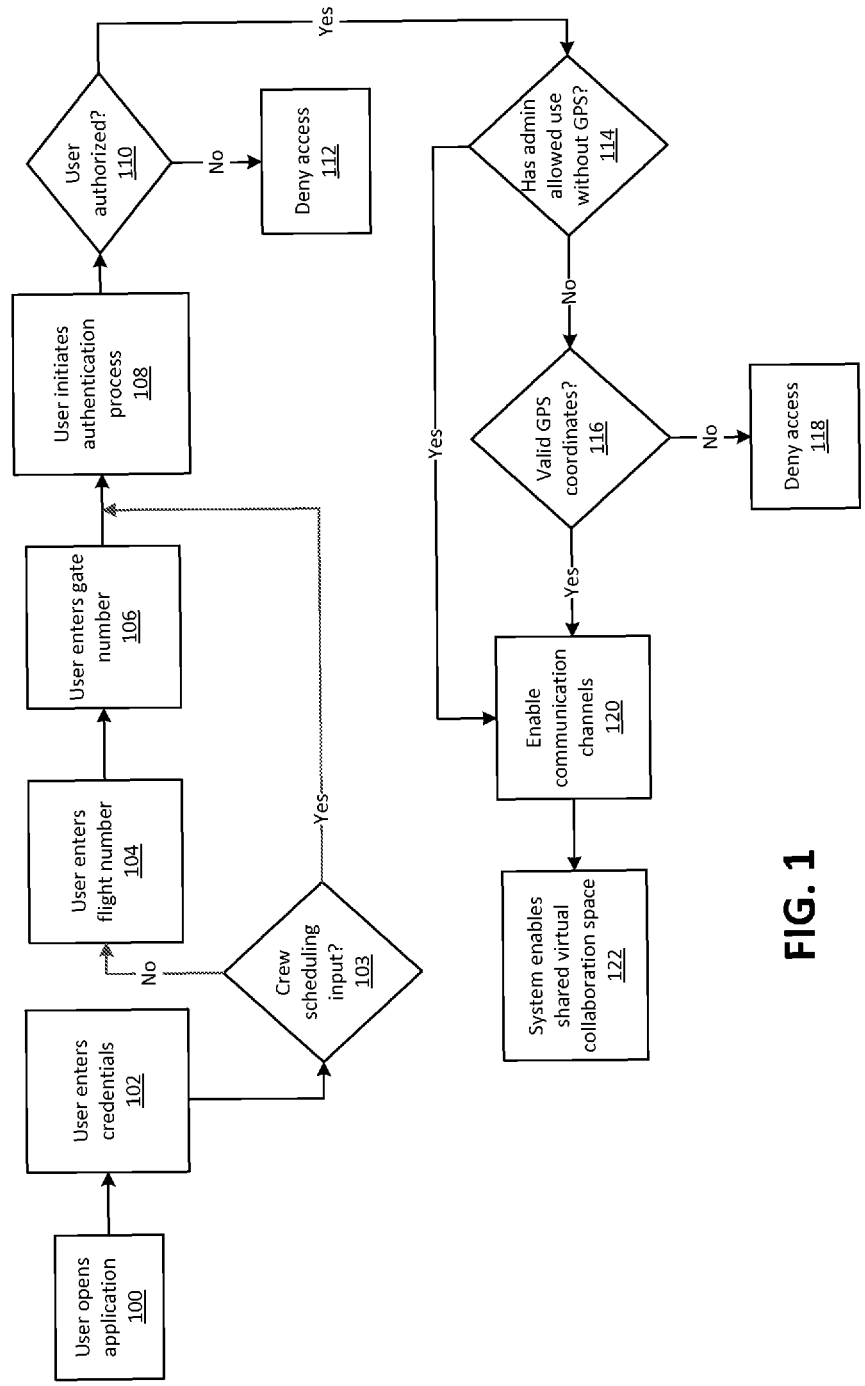
FIG. 1 depicts an example procedure for providing shared collaboration and communication space in accordance with this disclosure.

The use of various methods of communication as described above may lead to problems that may impact operational efficiency and effectiveness, especially during time critical operations, such as airline flight turn operations. Technical problems encountered in these scenarios may include: overlapping communications with radios using the same frequency across multiple flights; misinterpretation of verbal communications; inability to hear audio communications; and weak or no notification of incoming communications, to name a few. For example, in a commercial airline flight scenario, when passengers begin entering an aircraft, a minimum number of flight crew must remain on the aircraft due to rules, and the flight crew must use various communications methods to communicate with gate crew and maintenance personnel. Some flight crew may use personal cell phones to communicate, while others may use existing hardwired phones. However, some communications may need to be shared with multiple personnel, while other communications may be lost or miscommunicated. Many operators may attempt to solve the above technical problems by requesting redelivery of the original communications from the sender or requesting assistance from a knowledge holder when the original communication is not understood or when the receiver is unaware that the original message was sent.

Such actions lead to unnecessary delays or cancellations and other problems that may negatively impact the operator's ability to provide services. The present disclosure describes methods and systems for service operators to check in or log in to a shared collaboration and communication space by using a schedule identifier, location identifier, and/or geographic coordinates using a variety of devices, such as a mobile handheld or tablet device. In the example of a commercial airline flight, flight crew and support personnel may check in or log in to a shared collaboration and communication space by using a flight number, gate number, and location determination information, such as Global Positioning System (GPS) coordinates or estimated location based on cellular data. The present disclosure is applicable to other scenarios requiring communication among group members in a dynamic environment.

The various examples used in this disclosure are in the context of a commercial airline flight operation, but it should be understood that the described principles may be applied to any operational scenario where members of an operational entity need to dynamically communicate using one or more communications devices. Such examples in the field of transportation include airline, train, and cruise ship operations. Additionally, the disclosure may be applicable in other industries. For example, mobile applications and services are being developed for use in the hospitality industry, such as by personnel at hotels or by maintenance staff and management in large apartment complexes. Mobile devices may be used with hospitality staff to track work, location, and to enable mobile communications. In this disclosure, the term "operation" is used to refer to any operational scenario, such as an airline flight.

In an example implementation, a system for providing a shared collaboration and communication space may allow authorized personnel to log in to the shared collaboration and communication space using login credentials and other pertinent information. In the context of an airline flight, such information may include a flight number since each flight may be associated with a specific list of personnel who are assigned to work on the particular flight. A communications device with location determination capability, such as GPS, may provide the ability to verify that the user of the communications device is within the physical proximity of the associated airplane and/or gate. Furthermore, association with a particular flight may allow for the particular shared collaboration and communication space to be time-limited to a particular flight. For example, the shared collaboration and communication space for a flight may be active for a defined period of time prior to and after the flight. In some examples, the shared collaboration and communication space may be active for a defined period of time during "in-flight" operations. For example, flight attendants may want to communicate with the pilot or the gate operator on the ground while the airplane is in flight. Pilots may want to communicate privately with operations staff on the ground without the use of VHF radios. Such communications may be further enhanced through the availability of an internet-connected and networked airplane.

In some examples, a system for providing a shared collaboration and communication space may include an output from a crew scheduling system or process to be received by the system. The crew scheduling input may allow for efficient identification of users of the shared collaboration and communication space who are assigned to a particular gate and flight number. The users of the shared collaboration and communication space may communicate with each other using various methods. On a user's mobile device, the user may input the flight number and assigned gate. Alternatively, the system may have this information available based on the output of the crew scheduling system. The system may validate that the user is in the proximity of the gate by cross referencing a database of airport gate location coordinates and the location coordinates provided by the device.

In some examples, a system for providing a shared collaboration and communication space may provide the ability to record video, voice, and text communications that enable users to review what has been communicated. The video, voice, and text communications may be recorded for access by users of the shared collaboration and communication space and for later review and analysis. The storage of the communications may be performed on the client device or in a server database separate from the client device. In this way, voice, text, and video communications data may be stored for users to access in non-real time. Furthermore, users will not need to request redelivery of the original communication from the originator since the user can access the recorded communication.

In some examples, an administrator or other authorized user may be able to enter into a shared collaboration and communication space to communicate with users. For example, a flight coordinator or crew scheduler may need to communicate with a flight attendant to direct the flight attendant to another flight. Additionally, an administrator may allow some users to log in without the cross referencing of location coordinates. For example, flight attendants or pilots may be en route to a destination gate and may not yet be within proximity of the destination gate. In such cases, the flight attendants or pilots may be allowed to enter the shared collaboration and communication space to access information as well as to provide an update as to their status.

Once logged into a shared collaboration and communication space, users may communicate via voice, text, video, or other means of communication. In some examples, a user may share the screen of the mobile device. The shared collaboration and communication space may allow communications based on the output of the crew scheduling system. Furthermore, each allowed user may also have a profile that may describe an assigned role and identify with whom the user can communicate. For example, all the crew members assigned to a particular gate and flight number may be allowed to enter the shared collaboration and communication space for the gate and flight number. A flight attendant may need to communicate with the gate operator and flight deck crew, and the flight attendant may also need to communicate with the maintenance staff to deal with cabin logbook issues. Furthermore, the pilot may need to communicate with the maintenance mechanic or fuel loader on the ground. In some examples, a user's profile may limit with whom the user is allowed to communicate.

When an attempt is made to engage with another user in a shared collaboration and communication space, notifications may be generated when an incoming communication is detected on the receiving user's device. The notification may alert the user that another user is attempting to communicate with the user. The user may be able to read a text message, play an audio communication sent to the user, or begin a video communication session. The text communication, audio communication, or video communication may be recorded on a server and/or the client device for later rendering in non-real time.

FIG. 1 illustrates an example procedure for providing shared collaboration and communication space in accordance with this disclosure. Referring to FIG. 1, operation 100 illustrates that a user may launch a shared collaboration and communication space application on a device, such as a tablet or smartphone. Operation 102 illustrates that the user may enter authentication credentials. For example, the user may be prompted to enter a username and password. Additional challenges may also be presented to the user. Operation 103 illustrates determining if an input from a crew scheduling system is available. As discussed above, a crew scheduling service or system may provide data regarding personnel who are scheduled to work on a particular operation and the shared collaboration and communication space may automatically retrieve the schedule information for the user including the flight number. If an input from a crew scheduling system is not available, then operation 103 may be followed by operation 104. Operation 104 illustrates that the user may enter a flight number.

If an input from a crew scheduling system is available, then operation 103 may be followed by operation 108. Operation 108 illustrates the user initiating the authentication process. Operation 110 illustrates determining if the user is authorized to enter the shared collaboration and communication space. For example, the user's entered username and password may be verified to determine that the user is a recognized user, and the entered flight number and gate number may also be verified to determine that the user has been assigned to the flight associated with the entered flight number and gate number.

Operation 112 illustrates that the user may be denied access if the user is not a recognized user, and/or the user has not been assigned to the flight associated with the entered flight number and gate number. If the user is allowed to access the shared collaboration and communication space associated with the flight, then operation 110 may be followed by operation 114. Operation 114 illustrates determining if the user may access the shared collaboration and communication space without the use of location coordinates. If the user may access the shared collaboration and communication space without the use of location coordinates, then operation 114 may be followed by operation 120. Operation 120 illustrates that communications channels may be enabled for the user to access the shared collaboration and communication space. If the user must use location coordinates to access the shared collaboration and communication space, then operation 114 may be followed by operation 116. Operation 116 illustrates determining if the user's location coordinates are valid. This may comprise receiving current location coordinates from the user's device and determining that the coordinates are within a predetermined perimeter or geo-fence. For example, a radius centered around an airport gate area may be defined as a valid location for a particular flight. If the user's location coordinates are valid, then operation 116 may be followed by operation 120. If the user's location coordinates are not valid, then operation 116 may be followed by operation 118. Operation 118 illustrates denying access to the user.

Operation 120 may be followed by operation 122. Operation 122 illustrates enabling access to the shared collaboration and communication space and allowing communication with other users in the shared collaboration and communication space.

Figure 2:
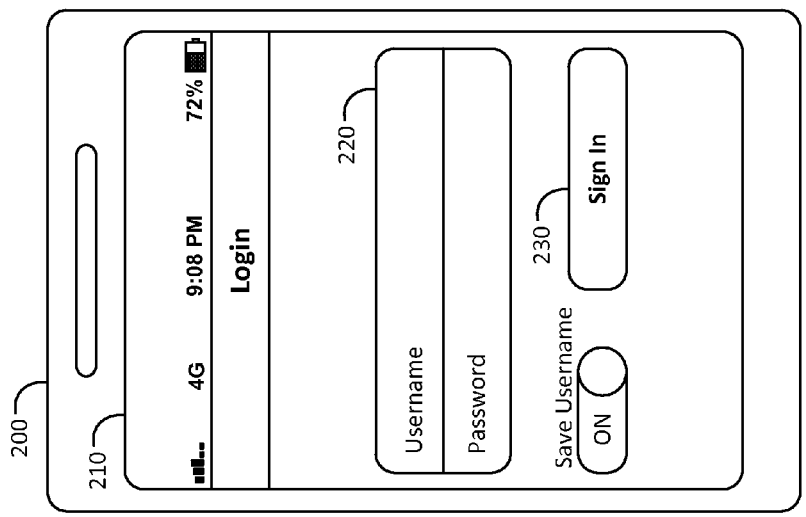
FIG. 2 depicts an example user interface that may be used in conjunction with a shared collaboration and communication space.

FIG. 2 illustrates an example user interface that may be used in conjunction with a shared collaboration and communication space. FIG. 2 depicts an example user device 200 that may be any device that includes a user interface 210, such as a tablet or smartphone. The user interface 210 may be presented in a Web browser or other client application executing on the device 200. A user may log in to the shared collaboration and communication space by entering username and password information 220. The user may then enter the information using a selection, such as the sign-in button 230, that allows the user to submit the entered information.

Figure 3:
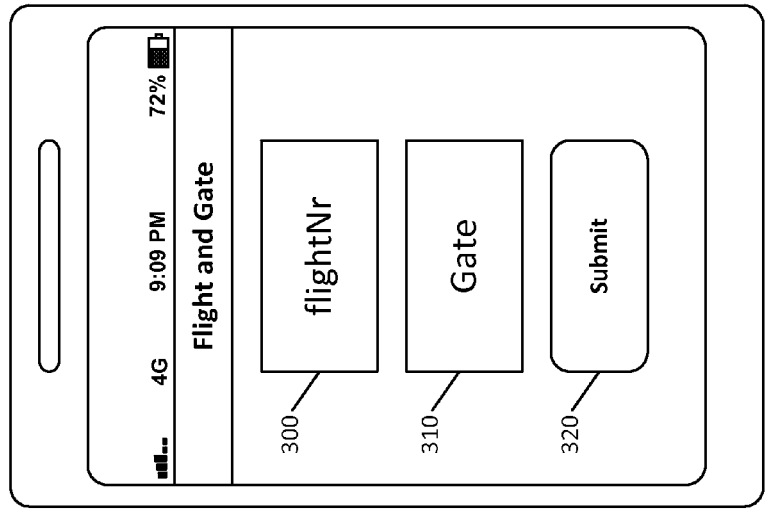
FIG. 3 depicts an example user interface that may be used in conjunction with a shared collaboration and communication space in which a user enters flight number and gate information.

FIG. 3 illustrates an example user interface that may be used in conjunction with a shared collaboration and communication space in which a user may enter flight number and gate information. As discussed above, this information may also be provided by the output of a crew scheduling system. FIG. 3 depicts an example user device, including a user interface that may be presented in a Web browser or other client application executing on the device. A user may enter flight number information 300 and gate information 310. The user may then enter the information using a selection, such as the submit button 320, that allows the user to submit the entered information.

Figure 4:
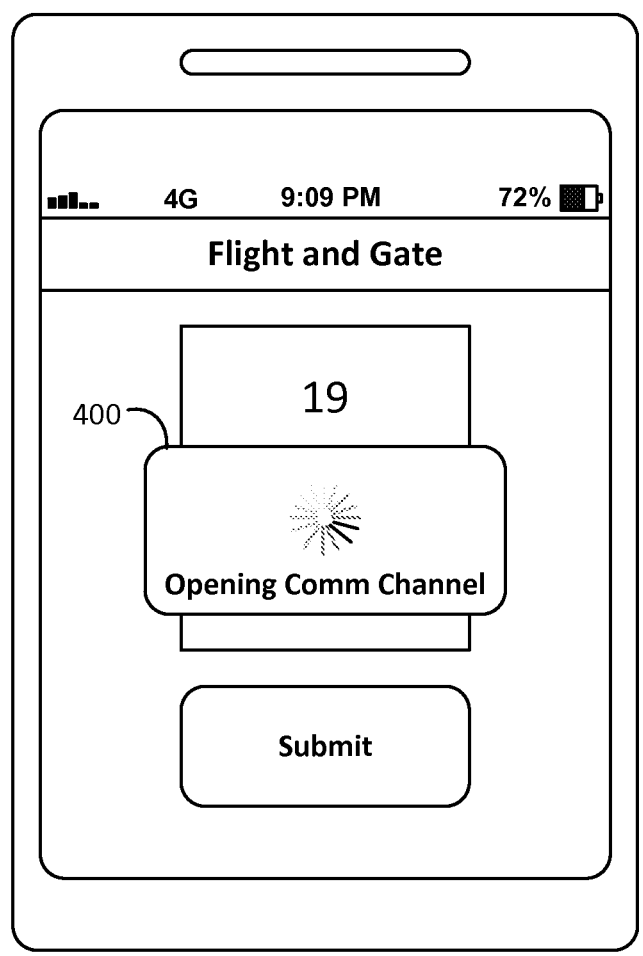
FIG. 4 illustrates an example user interface that may be used in conjunction with a shared collaboration and communication space in which a status indication is provided to the user.

FIG. 4 illustrates an example user interface that may be used in conjunction with a shared collaboration and communication space in which a status indication is provided to the user. For example, the user's location may be cross referenced and the username and password entered in FIG. 2 as well as the flight number and gate information entered in FIG. 3, may be verified and a collaboration space and communications channel may be opened.

Figure 5:
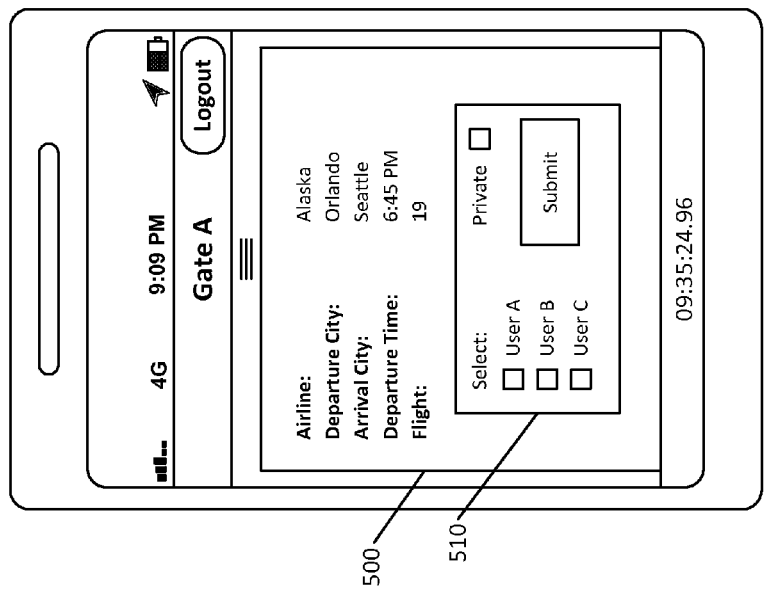
FIG. 5 illustrates an example user interface showing a shared collaboration and communication space that is exclusive to the flight associated with the entered flight and gate information.

FIG. 5 illustrates an example user interface showing a shared collaboration and communication space that is exclusive to the flight associated with the entered flight and gate information. The user interface may include specific flight information 500 including airline, departure city, arrival city, gate, and flight information. The user interface may also include a user interface selection 510 that allows for initiation of voice communication with one or more users from a list of users who are available for the user to collaborate with. An option for private communications with one or more of the users may also be provided. For example, the user may choose to communicate with the group of users or initiate a private communication with selected users. In other examples, the user may initiate voice, chat and text communications.

Figure 6:
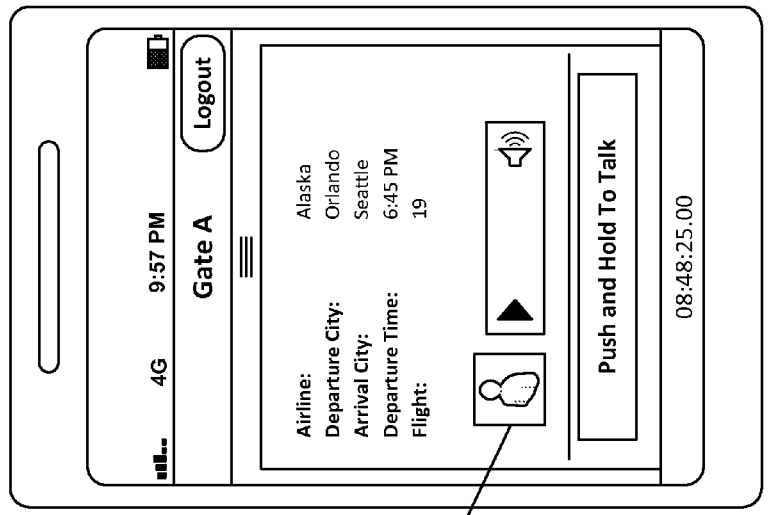
FIG. 6 illustrates an example user interface showing a shared collaboration and communication space that is exclusive to the flight associated with the entered flight and gate information, where a user is engaged in voice communications.

FIG. 6 illustrates an example user interface showing a shared collaboration and communication space that is exclusive to the flight associated with the entered flight and gate information, where a user is engaged in voice communications 600. As discussed above, voice, video, and chat communications may recorded for consumption at the convenience of the user in the event that the message is not understood or in the event that the notification is not properly interpreted.

Figure 7:
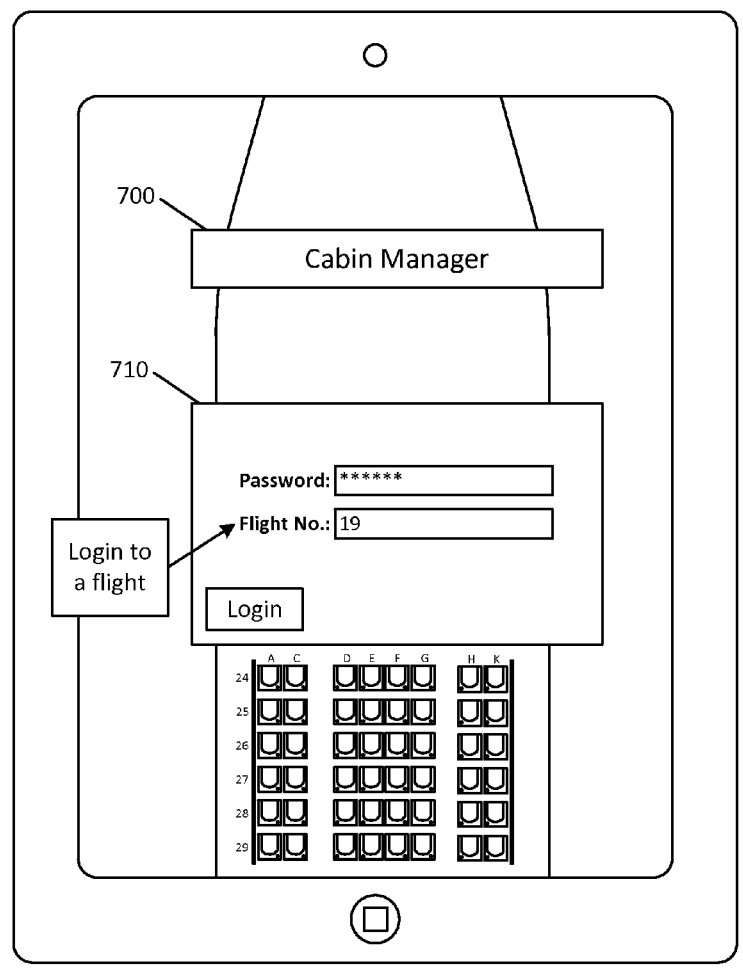
FIG. 7 illustrates an example user interface showing a shared collaboration and communication space that is exclusive to the flight associated with the entered flight and gate information, where a user is logging into a flight.

FIG. 7 illustrates an example user interface showing a shared collaboration and communication space in which the shared space is overlaid on another application. In the example shown, a user may be running a Cabin Manager application 700. The user may be able to invoke the shared collaboration and communication space from within the Cabin Manager application. The user may be provided with a login window 710, allowing the user to enter into the shared space while running the Cabin Manager application.

Figure 8:
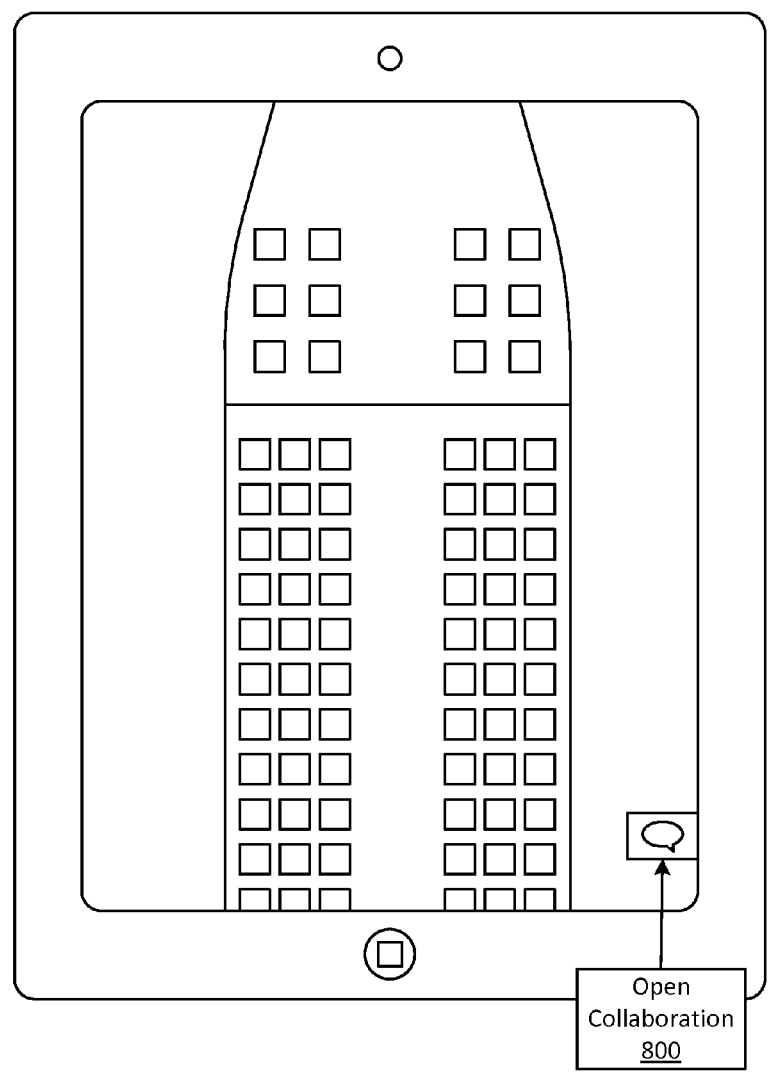
FIG. 8 illustrates another example user interface showing a shared collaboration and communication space in which the shared space is overlaid on another application.
Figure 9:
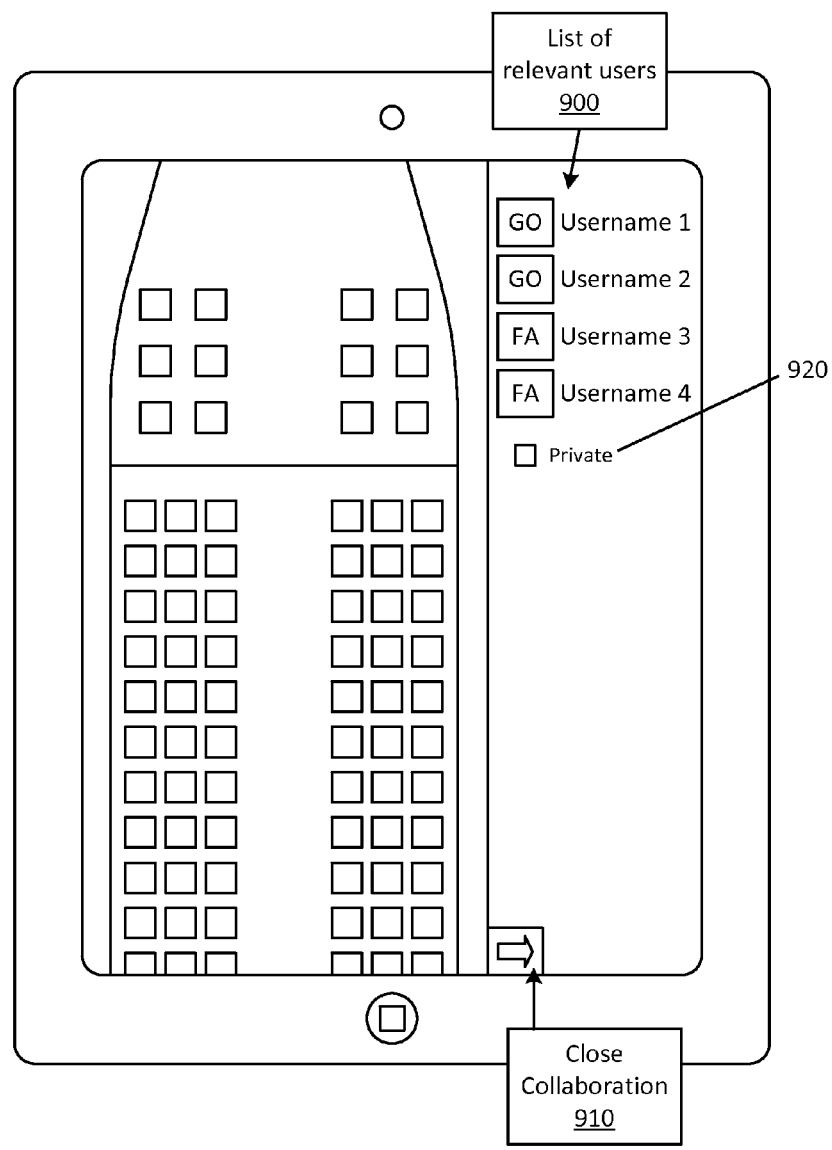
FIG. 9 illustrates an example user interface showing a shared collaboration and communication space overlaid on a Cabin Manager application.

FIG. 8 illustrates another example user interface showing a shared collaboration and communication space in which the shared space is overlaid on another application. In this example, once a user has logged into the shared space while running the Cabin Manager application, the user may be able to invoke a collaboration tab 800 that may provide a list of users who are also "checked-in" to this flight. For example, FIG. 9 illustrates an example user interface showing a shared collaboration and communication space overlaid on the Cabin Manager application. After the user has invoked the collaboration tab 800 in FIG. 8, a list of users 900 may be provided, indicating other users who are also "checked-in" to this flight. The user may also select a close collaboration selection 910 to close the shared space while continuing to run the Cabin Manager application.

Figure 10:
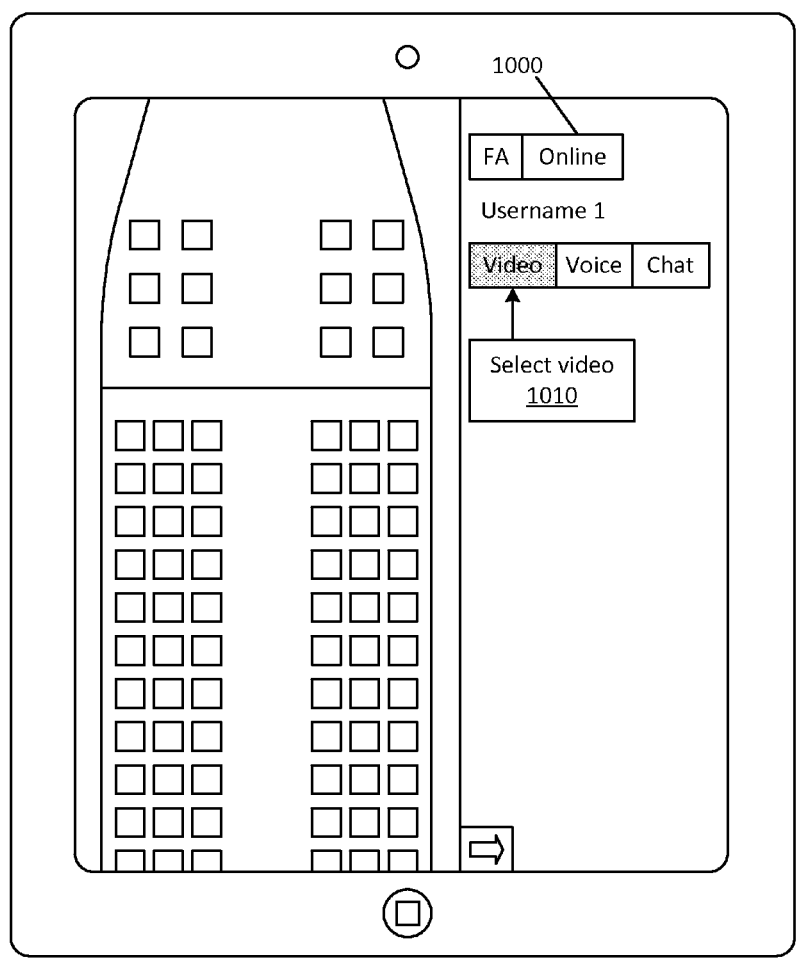
FIG. 10 illustrates an example user interface showing a shared collaboration and communication space in which the shared space is overlaid on another application, and where the user is initiating communication with other users of the shared space.

FIG. 10 illustrates an example user interface showing a shared collaboration and communication space in which the shared space is overlaid on another application and where the user is initiating communication with other users of the shared space. In the example, the user may have selected a flight attendant who is indicated as being online (as indicated by "FA Online" 1000). The user may further initiate a video conversation 1010. As discussed above, the user may also be provided with an option 920 to privately communicate within the collaboration space. These private communications may be recorded but are not shown to other users in the collaboration space.

Figure 11:
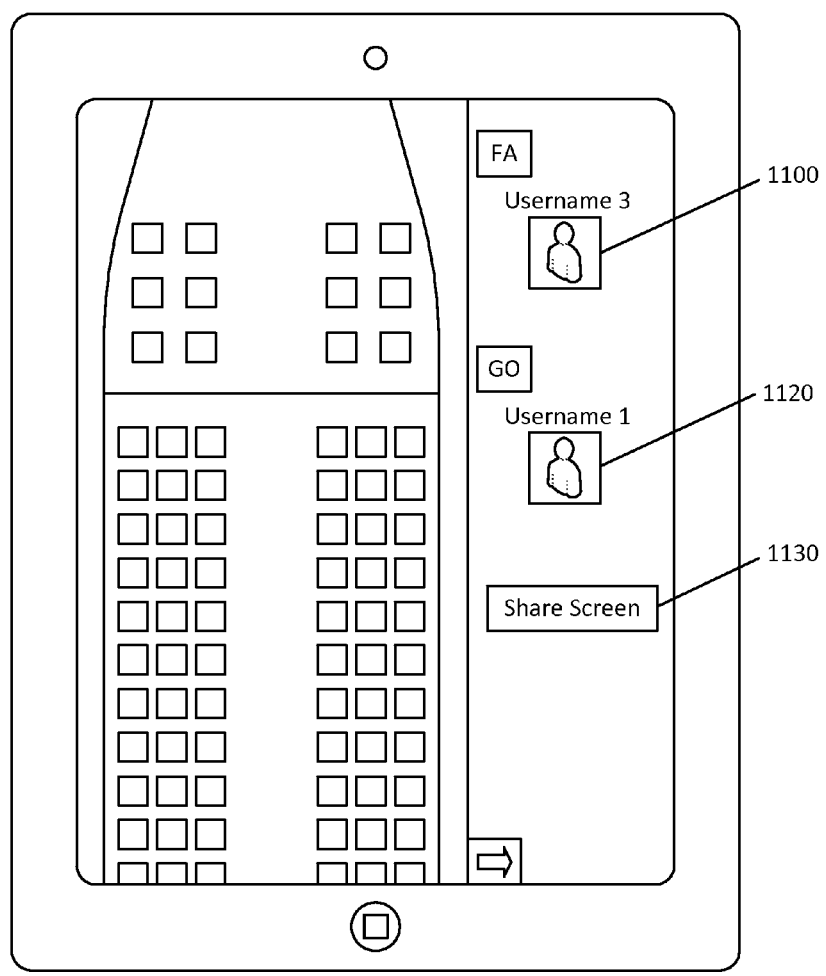
FIG. 11 illustrates an example user interface showing a shared collaboration and communication space in which the shared space is overlaid on another application, and where the user is engaged in communication with other users of the shared space.

FIG. 11 illustrates an example user interface showing a shared collaboration and communication space in which the shared space is overlaid on another application and where the user is engaged in communication with other users of the shared space. In the example, after the user has initiated a video conversation, the user interface may show the flight attendant 1100 who is in communication with the user, who in this example is shown as a ground operator 1120. In some examples, the user may be provided with an option to share the screen 1130 with the other user selected for collaboration.

Figure 12:
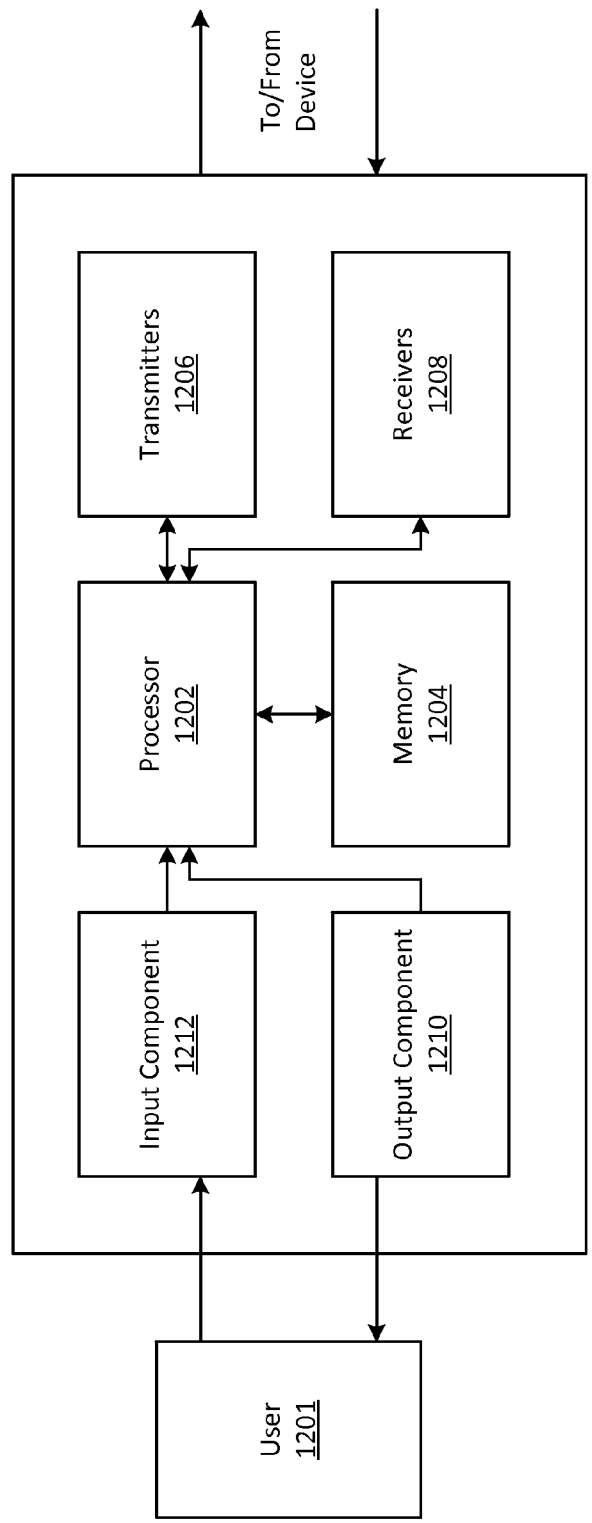
FIG. 12 is an example schematic diagram of a user device that may be used in conjunction with a shared collaboration and communication space.

FIG. 12 is an example schematic diagram of a user device that may be used in conjunction with a shared collaboration and communication space. In one example, a user device may include a processor 1202, a memory device 1204 coupled to processor 1202, one or more wireless transmitters 1206, one or more wireless receivers 1208, an output component 1210, and an input component 1212.

Processor 1202 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above example examples are not intended to limit in any way the definition and/or meaning of the term "processor."

Memory device 1204 includes a non-transitory computer-readable storage medium, such as, without limitation, random access memory (RAM), flash memory, a hard disk drive, a solid state drive, a diskette, a Flash drive, a compact disc, a digital video disc, and/or any suitable memory. In the exemplary implementation, memory device 1204 includes data and/or instructions embodying aspects of the disclosure that are executable by processor 1202 (e.g., processor 1202 may be programmed by the instructions) to enable processor 1202 to perform the functions described herein. Additionally, the memory device 1204 may comprise an operation system and applications.

Wireless transmitters 1206 are configured to transmit control signals and data signals over a network. In one example, wireless transmitters 1206 may transmit in a radio frequency spectrum and operate using an appropriate communication protocol.

Wireless receivers 1208 are configured to receive control signals and data signals over network. In one example, wireless receivers 1208 may receive signals on a radio frequency spectrum using an appropriate communication pro.

The node may also include at least one output component 1210 for presenting information to a user 1201. Output component 1210 may be any component capable of conveying information to user 1201. In some implementations, output component 1210 includes an output adapter, such as a video adapter and/or an audio adapter or the like. An output adapter is operatively coupled to processor 1202 and is configured to be operatively coupled to an output device, such as a display device (e.g., a liquid crystal display (LCD), organic light emitting diode (OLED) display, cathode ray tube (CRT), "electronic ink" display, or the like) or an audio output device (e.g., a speaker, headphones, or the like). In some implementations, at least one such display device and/or audio device is included with output component 1210.

The node may also include at least one input component 1212 for receiving input from user 1201. Input component 1212 may include, for example, a keyboard, a pointing device, a mouse, a stylus, a touch sensitive panel (e.g., a touch pad or a touch screen), a gyroscope, an accelerometer, a position detector, an audio input device, or the like. A single component, such as a touch screen, may function as both an output device of output component 1210 and input component 1212. In some implementations, output component 1210 and/or input component 1212 include an adapter for communicating data and/or instructions between the node and a computer connected thereto.

As discussed above, at least a part of the communications in the shared collaboration and communication space may be recorded for later retrieval and consumption or analysis. In some examples, the communications may be recorded and stored on the user device. In other examples, the communications may be stored on a server. For example, the shared collaboration and communication space may be implemented and facilitated by a service running remotely.

It will be appreciated that, while various items are illustrated as being stored in memory or on storage while being used, these items or portions of them may be transferred between memory and other storage devices. Alternatively, in other embodiments some or all of the software modules and/or systems may execute in memory on another device and communicate with the illustrated computing systems via inter-computer communication. In some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

In some embodiments, a system memory may be used, which is one embodiment of a computer-readable storage medium configured to store program instructions and data as described above for FIGS. 1-12 for implementing embodiments of the corresponding methods and apparatus. However, in other embodiments, program instructions and/or data may be received, sent, or stored upon different types of computer-accessible media. Generally speaking, a computer-readable storage medium may include non-transitory and tangible storage media or memory media such as magnetic or optical media, e.g., disk or DVD/CD coupled to a computer system or gateway device. A computer-readable storage medium may also include any volatile or non-volatile media such as RAM (e.g., SDRAM, DDR SDRAM, RDRAM, SRAM, etc.), ROM, etc., that may be included in some embodiments of the computer systems described above as system memory, gateway device, or another type of memory. Portions or all of the multiple computer systems, such as those illustrated herein, may be used to implement the described functionality in various embodiments; for example, software components running on a variety of different devices and servers may collaborate to provide the functionality.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when other illustrated routines instead lack or include such functionality respectively or when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different ways in other embodiments, such as by having a single data structure split into multiple data structures or by having multiple data structures consolidated into a single data structure, and may store more or less information than is described (e.g., when other illustrated data structures instead lack or include such information respectively or when the amount or types of information that is stored is altered).

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example examples. The example systems and components described herein may be configured differently than described. For example, elements may be added to, removed from, or rearranged compared to the disclosed example examples.

While certain example or illustrative examples have been described, these examples have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

The invention claimed is:

1. A method for communication by a predetermined group of users using one or more computing devices, the method comprising:
   receiving, from one of the predetermined group of users, a request to log into a shared collaboration and communication space associated with the predetermined group of users, the shared collaboration and communication space being associated with the predetermined group of users for an airline flight and for a time period beginning at a predetermined time prior to departure and ending at a predetermined time after arrival of the airline flight;
   authenticating the request based at least in part on a user identity for the one user and a determination as to whether the one user is associated with the airline flight during the time period; and
   in response to the authenticating, providing a user interface indicative of the shared collaboration and communication space and allowing access to the shared collaboration and communication space for the airline flight and for the time period associated with the airline flight.

2. The method of claim 1, wherein the predetermined group of users comprises personnel assigned to the airline flight.

3. The method of claim 1, wherein the authenticating is based on a username and password.

4. The method of claim 1, wherein the authenticating is based on an approximate location of a computing device submitting the request.

5. The method of claim 4, wherein the approximate location is determined based on location determination information received from the computing device.

6. The method of claim 1, further comprising providing communications with the predetermined group of users.

7. The method of claim 6, wherein the communications include audio communications, video communications, or text messaging.

8. The method of claim 1, further comprising recording the communications.

9. The method of claim 8, further comprising allowing users of the group of users to request recorded communications.

10. The method of claim 1, further comprising receiving scheduling information indicative of the predetermined group of users and the airline flight.

11. The method of claim 1, wherein the user interface is overlaid on an application.

12. The method of claim 4, wherein the authenticating based on the approximate location of the computing device is based on a selection by an administrator.

13. A device configured to communicate in a shared collaboration and communication space, the device comprising at least a processor and memory, the memory having stored thereon computer executable instructions that, when executed by the at least one processor, cause the device to at least:
communicate a request from one of a predetermined group of users to join the shared collaboration and communication space, the shared collaboration and communication space associated with the predetermined group of users for an airline flight and for a time period beginning at a predetermined time prior to departure and ending at a predetermined time after arrival of the airline flight;
communicate a user identity for the one user and information identifying the airline flight; and
in response to receiving an indication that the request is approved, the request being approved based on a determination as to whether the one user is associated with the airline flight during the time period, executing an application for allowing the one user to join the shared collaboration and communication space for the airline flight and for the time period associated with the airline flight.

14. The device of claim 13, further computer executable instructions that, when executed by the at least one processor, cause the device to at least generate a user interface indicative of the shared collaboration and communication space.

15. The device of claim 14, wherein the shared collaboration and communication space allows communications between the predetermined group of users.

16. A non-transitory computer-readable medium having computer-readable instructions stored thereon, the computer-readable instructions comprising instructions that upon execution on a computing system, at least cause:
receiving information indicative of a predetermined group of users and an airline flight associated with the predetermined group of users, the airline flight associated with a time period beginning at a predetermined time prior to departure and ending at a predetermined time after arrival of the airline flight;
allowing requesting users of the predetermined group of users to join a shared collaboration and communication space associated with the airline flight for the associated time period based on identification of the requesting users and verification that the users are associated with the airline flight and the associated time period; and
allowing users who have joined the shared collaboration and communication space to communicate via the shared collaboration and communication space for the time period associated with the airline flight.

17. The non-transitory computer-readable medium of claim 16, wherein the allowing requesting users to join the shared collaboration and communication space is further based on a determined geographic location of the requesting users.

18. The non-transitory computer-readable medium of claim 16, further comprising computer-readable instructions comprising instructions that upon execution on a computing system, at least cause:
recording communications by the predetermined group of users.

* * * * *